United States Patent [19]
Okada et al.

[11] Patent Number: 4,838,120
[45] Date of Patent: Jun. 13, 1989

[54] CENTRIFUGALLY ACTUATE CLUTCH FOR A LIMITED SLIP DIFFERENTIAL

[75] Inventors: Tadashi Okada, Kanagawa; Yuuji Furukawa, Tachikawa; Makoto Murata, Tokyo, all of Japan

[73] Assignee: Nissan Motor Company, Limited, Yokahama, Japan

[21] Appl. No.: 487,300

[22] Filed: Apr. 21, 1983

[30] Foreign Application Priority Data

May 21, 1982 [JP] Japan ............................ 57-74360[U]

[51] Int. Cl.$^4$ ............................................. F16H 1/44
[52] U.S. Cl. ...................................... 74/711; 74/713; 192/105 B
[58] Field of Search ............... 74/711, 713, 710, 710.5; 192/105 B, 105 BA

[56] References Cited

U.S. PATENT DOCUMENTS

| | | | |
|---|---|---|---|
| 1,838,380 | 12/1931 | Fraser | 74/711 |
| 1,994,588 | 3/1935 | Nakashian | 192/105 B |
| 3,017,004 | 1/1962 | Fawick | 192/105 B |
| 3,184,025 | 5/1965 | Aschauer | 192/105 B |
| 3,304,806 | 2/1967 | Adams | 74/711 |
| 3,474,689 | 10/1969 | Young | 74/711 |
| 3,517,573 | 6/1970 | Roper | 74/711 |
| 3,624,717 | 11/1971 | Brubaker | 74/713 X |
| 3,964,346 | 6/1976 | Myers, Sr. | 74/711 |
| 4,283,963 | 8/1981 | Hickey et al. | 74/713 X |

FOREIGN PATENT DOCUMENTS

| | | |
|---|---|---|
| 1045815 | 5/1959 | Fed. Rep. of Germany . |
| 1963173 | 6/1971 | Fed. Rep. of Germany . |
| 2706066 | 8/1978 | Fed. Rep. of Germany . |
| 1247432 | 10/1960 | France ............................ 192/105 B |
| 1270107 | 7/1961 | France . |
| 80122 | 6/1919 | Switzerland . |
| 457157 | 7/1968 | Switzerland . |

OTHER PUBLICATIONS

French Search Report.

*Primary Examiner*—Dirk Wright
*Attorney, Agent, or Firm*—Foley & Lardner, Schwartz, Jeffery, Schwaab, Mack, Blumenthal & Evans

[57] ABSTRACT

A limited slip differential of this invention is equipped with two centrifugal clutches that are interposed between a differential casing and side gears or pinion gears. The centrifugal clutches provide a direct drive between the casing and the side gears in high speed driving.

11 Claims, 2 Drawing Sheets

CENTRIFUGALLY ACTUATE CLUTCH FOR A LIMITED SLIP DIFFERENTIAL

BACKGROUND OF THE INVENTION

1. Field of the Invention

The present invention relates to automotive limited slip differentials.

2. Description of the Prior Art

In a vehicle that is equipped with a prior art limited slip differential, the driving torque or ring gear torque is distributively applied to the left and right driving wheels depending upon the difference in the rotation or traction of the driving wheels and without relation to the vehicle speed. Due to this, a shock to the vehicle body or rear end swing occurs when one driving wheel raises off the ground and touches it again. In high speed driving, this considerably deteriorates the directional stability of the vehicle. Further, if the inside driving wheel rises to spin during high speed cornering, a greater driving torque is applied to the outside driving wheel. This deteriorates the yaw stability of the vehicle.

With the prior art limited slip differentials, it is therefore impossible to provide vehicles with excellent directional stability in high speed straightahead driving and also with excellent yaw stability in high speed cornering.

SUMMARY OF THE INVENTION

In accordance with the present invention, there is provided a novel and improved limited slip differential for automotive vehicles. The limited slip differential comprises a casing adapted to be rotatably driven, a pair of pinion gears retained within the casing, a pair of side gears retained within the casing and engaging the pinion gears to form a differential mechanism, and centrifugal clutch means for providing a direct drive between the casing and the side gears when the speed of rotation of the casing is higher than a predetermined value.

This structure enables the limited slip differential to be free from the drawbacks noted above and to provide excellent directional stability and yaw stability in high speed driving.

It is accordingly an object of the present invention to provide a novel and improved limited slip differential that is free from the above noted drawbacks inherent in the prior art limited slip differential.

It is another object of the present invention to provide a novel and improved limited slip differential of the above described character which provides excellent yaw stability in high speed cornering as well as excellent directional stability in high speed straightahead driving, without deteriorating its intrinsic function.

It is a further object of the present invention to provide a novel and improved limited slip differential of the above described character which is quite simple in structure and of great practical use.

BRIEF DESCRIPTION OF THE DRAWINGS

The features and advantages of the limited slip differential according to the present invention will become more clearly appreciated from the following description taken in conjunction with the accompanying drawings, in which.

DESCRIPTION OF THE PREFERRED EMBODIMENTS

Figure 1:
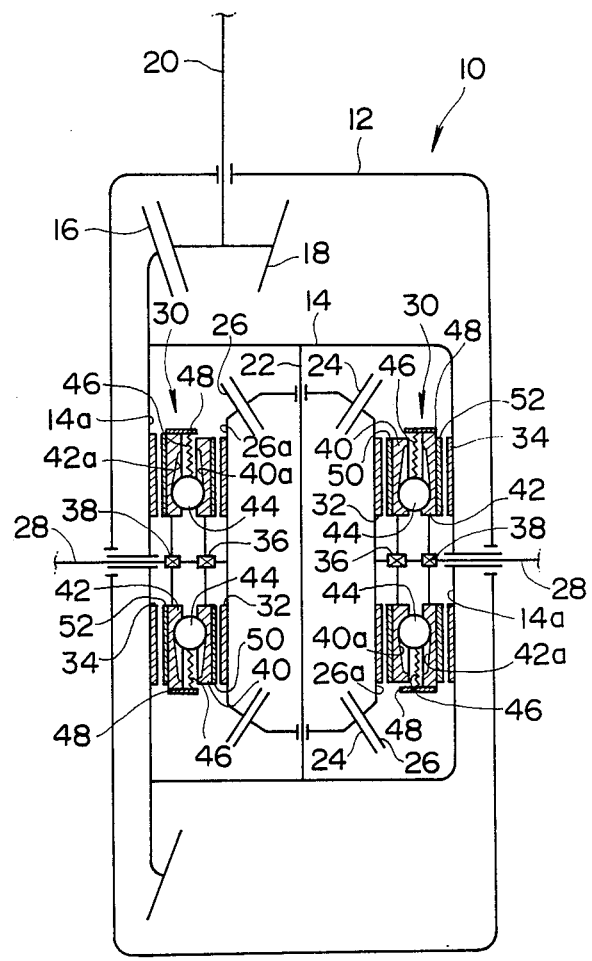
FIG. 1 is a schematic illustration of a limited slip differential according to an embodiment of the present invention.

Referring to FIG. 1, a limited slip differential according to an embodiment of the present invention is generally designated by 10 and shown as comprising an outer housing 12 with a differential casing 14 rotatably supported therein. A ring gear 16 is drivingly attached to the casing 14 to rotate together therewith about a common axis. The ring gear 16 engages a drive gear 18 within the housing 12 which is fixed to one end of a drive shaft 20. The drive shaft 20 extends longitudinally of a vehicle body towards the vehicle's source of driving power and provides power therefrom to rotatably drive the casing 14 through the drive gear 18 and ring gear 16. A pinion shaft 22 retained in the casing 14 transverses the axis of rotation of the casing 14 substantially at right angles. A pair of pinion gears 24 are rotatably supported on the pinion shafts 22, one near each end, within the casing 14. A pair of side gears 26 retained within the casing 14 engage the pinion gears 24 to form a standard differential mechanism. The side gears 26 are axially aligned with the casing 14 and are rotatable together with the casing 14 or in opposite directions with respect to each other within the casing 14. Each side gear 26 is splined to or otherwise drivingly connected to an end of an axle shaft 28. The axle shaft 28 extends outward from the side gear 26 and has end for attachment of a driving wheel, not shown.

Interposed between each side gear 26 and the casing 14 is a centrifugal clutch 30 that operates in response to the speed of rotation of the axle shaft 28, i.e., the vehicle speed. The friction clutch 30 comprises a pair of annular friction shoes or friction materials 32 and 34 respectively attached to each side gear 26 and the casing 14. More specifically, each side gear 26 has a generally flat, annular end surface 26a while the casing 14 has a generally flat, annular end surface 14a disposed parallel to and in opposition to the side gear end surface 26a. The friction shoes 32 and 34 are respectively attached to the side gear end surface 26a and the casing end surface 14a. The centrifugal clutch 30 further comprises two spline hubs 36 and 38 splined to the axle shaft 28 so as to be slidable thereon and a pair of annular guide plates 40 and 42 respectively attached at the inner peripheries to the spline hubs 36 and 38 and interposed between the friction shoes 32 and 34. The guide plates 40 and 42 are respectively formed at sides opposed to each other with annular flyball guiding grooves 40a and 42a that gradually reduce in depth as the grooves extend radially outward with respect to the axle shaft 28. The centrifugal clutch 30 further comprises a plurality of flyballs or flyweights 44 movably received in the guiding grooves 40a and 42a. The flyballs 44 are operative to separate the guide plates 40 and 42 increasingly along the axis of the axle shaft 28 as they move radially outward in the grooves 40a and 42a. A plurality of compression coil springs 46 are provided to urge the flyballs 44 to their radially inner most positions in the grooves 40a and 42a to allow the guide plates 40 and 42 to move closer. To this end, each spring 46 has an end retained by a spring retainer 48 attached to the outer periphery of one of the guide plates 42 and the other end engaged with a corresponding one of the flyballs 44. At the other sides opposite to the sides formed with the flyball guiding grooves 40a and 42a, the guide plates 40 and 42 have respectively attached thereto annular friction shoes or friction materials 50 and 52 that are contactable with the friction shoes 32 and 34 when the guide plates 40 and 42 are separated increasingly by the movement of the flyballs 44.

In operation, the flyballs 44 are subjected to centrifugal force that increases as the speed of rotation of the axle shaft 28 increases. As the centrifugal force on the flyballs 44 increases, the flyballs 44 tend to move radially outward, allowing the friction shoes 50 and 52 on the guide plates 40 and 42 to be pushed against the matching friction shoes 32 and 34 on the side gear 26 and the casing 14 with increasing strength.

In low to medium speed driving, the centrifugal clutch 30 is half-engaged or partially engaged since the centrifugal force on the flyballs 44 is not so large. In this situation, a part of the driving power is transmitted via the centrifugal clutch 30 instead of the differential mechanism. The remaining part of the driving power is transmitted via the differential mechanism, that is, via the pinion gears 24 and the side gears 26. A part of the driving power transmitted directly from the casing 14 to the axle shaft 28 increases with increasing vehicle speed.

In high speed driving, i.e., when the vehicle speed increases above a predetermined amount, the centrifugal clutch 30 is fully engaged. In this situation, the centrifugal clutch 30 provides a direct drive between the casing 14 and the axle shaft 28, so that the substantially entire driving power is transmitted directly from the casing 14 to the axle shaft 28.

From the foregoing, it is to be understood that in low to medium speed driving, the limited slip differential of the present invention acts similar to the prior art limited slip differentials.

It is further to be understood that the limited slip differential of this invention provides excellent directional stability in high speed straightahead driving since it assuredly prevents any shock to the vehicle body or rear end swing due to the fully engaged centrifugal clutches 30 that allows the left and right axle shafts 28 to be driven directly by the casing 14. In high speed cornering, the limited slip differential provides excellent yaw stability for the similar reason.

Figure 2:
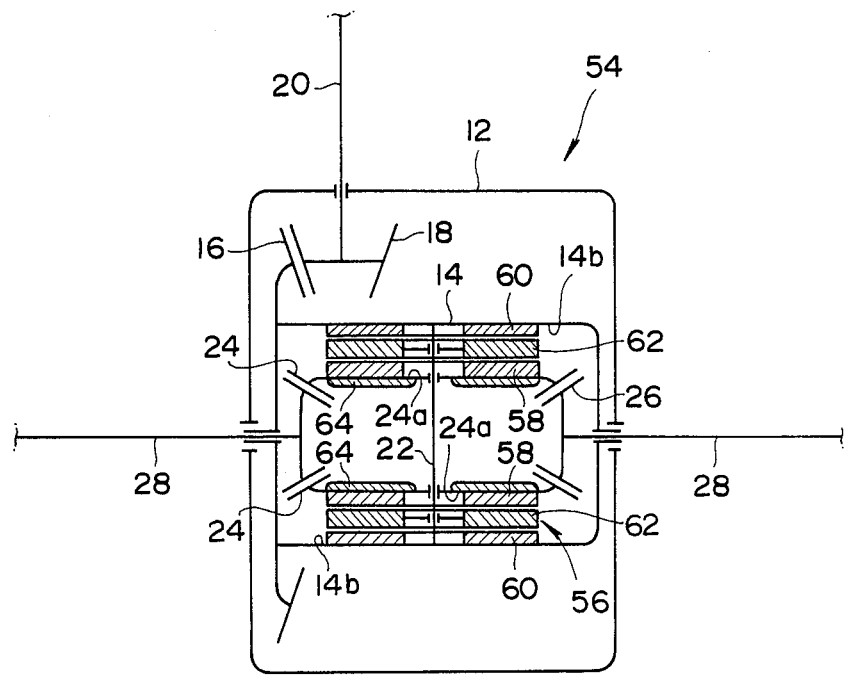
FIG. 2 is a schematic illustration of a limited slip differential according to another embodiment of the present invention.

FIG. 2 show a modification of this invention, in which similar or corresponding parts to those of the previous embodiment are indicated by like reference numerals.

Referring to FIG. 2, the limited slip differential according to a modification of this invention is generally designated by 54 and shown as comprising a centrifugal clutch 56 that is interposed between each pinion gear 24 and the casing 14. The centrifugal clutch 56 includes a pair of annular friction shoes or materials 58 and 60 respectively attached to each pinion 24 and the casing 14. More specifically, each pinion gear 24 has a generally flat annular end surface 24a while the casing 14 has a generally flat, annular surface portion 14b disposed parallel to and in opposition to the pinion gear end surface 24a. The friction shoes 58 and 60 are respectively attached to the pinion gear end surface 24a and the casing surface portion 14b. The centrifugal clutch 54 further includes a friction disc 62 interposed between the friction shoes 58 and 60 and rotatably and axially slidably mounted on the pinion shaft 22. The pinion gears 24 are mounted on the pinion shaft 22 in a manner to be rotatable and axially slidable thereon. The centrifugal clutch 56 further includes a thin, annular flyweight 64 attached to the pinion gear 24 to increase the weight of the pinion gear.

In operation, the pinion gears 24 with the flyweights 64 are subjected to centrifugal force that increases as the speed of rotation of the casing 14 increases. That is, as the speed of rotation of the casing 14 increases, the side gears 24 tend to move toward the ends of the pinion shaft 22, i.e., toward the surface portions 14b of the casing 14 increasingly, thus allowing the friction disc 62 to be clamped between the friction shoes 58 and 60 with increasing strength.

Since in low to medium speed the centrifugal clutch 56 is half-engaged or partly engaged while in high speed driving it is fully engaged, this embodiment can produce substantially the same effect as the previous embodiment.

Obviously, numerous modifications and variations of the present invention are possible in light of the above teachings. It is therefore to be understood that within the scope of the appended claims, the invention may be practiced otherwise than as specifically described herein.

What is claimed is:

1. A limited slip differential comprising:
    a casing adapted to be rotatably driven;
    a pair of pinion gears retained within said casing;
    a pair of side gears retained within said casing and engaging said pinion gears to form a differential gear mechanism; and
    centrifugal clutch means for providing a direct drive between said casing and both of said side gears when said side gears are driven to rotate in the same direction at a substantially equal speed, said speed being any speed which is higher than a predetermined value.

2. A limited slip differential as set forth in claim 1, in which said centrifugal clutch means comprises two centrifugal clutches interposed between said side gears and said casing, respectively.

3. A limited slip differential as set forth in claim 1, in which said centrifugal clutch means comprises two centrifugal clutches interposed between said pinion gears and said casing, respectively.

4. A limited slip differential as set forth in claim 2, in which each of said side gears has a generally flat, annular end surface while said casing has a generally flat, annular end surface parallel and opposed to said side gear end surface, in which each of said side gears is mounted on an end of an axle shaft, and in which each of said centrifugal clutches comprises a pair of annular friction materials respectively attached to said side gear end surface and said casing end surface, two spline hubs splined to said axle shaft, a pair of annular guide plates respectively attached at the inner peripheries thereof to said spline hubs and interposed between said friction materials, at sides opposed to each other each of said guide plates, having annular flyball guiding grooves that gradually reduce in depth as said grooves extend radially outward with respect to said axle shaft, a plurality of flyballs movably received in said grooves and operative to separate said guide plates increasingly along the axis of said axle shaft as the flyballs move radially outward in the grooves, and biasing means for urging said flyballs to their radially inner most positions to allow said guide plates to move toward each other.

5. A limited slip differential as set forth in claim 4, in which said biasing means comprise a plurality of compression coil springs, each spring having an end retained by a spring retainer attached to the outer periphery of one of said guide plates and the other end engaged with the corresponding one of said flyballs.

6. A limited slip differential as set forth in claim 3, in which each of said pinion gears has a generally flat, annular end surface while said casing has a generally flat, annular surface portion opposed to said pinion gear end surface, in which said pinion gears are mounted on a pinion shaft in a manner to be rotatable and axially slidable thereon, and in which each of said centrifugal clutches comprises a pair of annular friction materials respectively attached to said pinion gear end surface and said casing surface portion, respectively, a friction disc interposed between said friction materials and rotatably and axially slidably mounted on said pinion shaft, and a flyweight attached to each of said pinion gears.

7. A limited slip differential, comprising:
a rotatably mounted casing;
means for rotatably driving said casing;
a pair of pinion gears rotatably mounted within said casing;
a pair of side gears mounted within said casing and engaging said pinion gears to form a differential gear mechanism; and
centrifugal clutch means for actuating a direct drive between said casing and said side gears when said side gears rotate in the same direction at a substantially equal speed which is higher than a predetermined speed so as to disable the differential action of said differential gear mechanism, and for deactivating said direct drive below said predetermined speed so as to enable the differential action of said differential gear mechanism.

8. A limited slip differential as set forth in claim 1 in which said centrifugal clutch means comprises two centrifugal clutches connected for rotation, respectively, with said side gears.

9. A limited slip differential as set forth in claim 7 wherein said centrifugal clutch means comprises at least one centrifugal clutch connected for rotation with said casing.

10. A limited slip differential as set forth in claim 8 wherein said clutches are disposed to make a direct connection between said casing and said side gears to prevent any relative movement between said casing and said side gears.

11. A limited slip differential as set forth in claim 9 wherein said centrifugal clutch is disposed to make a direct connection between one of said pinion gears and said casing to prevent any relative movement between said one of said pinion gears and said casing.

* * * * *